Patented Apr. 5, 1938

2,113,355

UNITED STATES PATENT OFFICE 2,113,355

HARD COMPOSITIONS OF MATTER

Philip M. McKenna, Unity Township, Westmoreland County, Pa.

No Drawing. Application December 13, 1937, Serial No. 179,553

8 Claims. (Cl. 75—136)

This invention relates to hard compositions of matter for use as the cutting points of metal-cutting tools, for use as dies, for providing wear-resisting surfaces, and for similar purposes, and relates more particularly to hard compositions of matter containing, together with cobalt or nickel or other materials as a binding material, a new carbide compound composed, in ultimate chemical analysis, of the elements tungsten, titanium and carbon, and formed into very strong and hard compositions. The invention also relates to hard compositions of matter of this nature containing, in addition to the new chemical compound stated above, carbides of the elements tantalum, columbium, titanium, and/or zirconium, and solid solutions of certain of said carbides in another of said carbides, and more specifically, the invention relates to hard compositions of matter having as an ingredient the new hard carbide, being the new chemical compound corresponding to the chemical formula $WTiC_2$, described and claimed in my copending application, Serial No. 179,551, and formed as described in my copending application, Serial No. 179,552, both of such applications being filed of even date herewith, and to which reference is hereby made. Cross-reference is likewise made to my copending application, Serial No. 179,554, directed to the process of forming the hard compositions of matter herein described, and filed of even date herewith.

The principal object of my invention is to provide new hard compositions of matter that will have greater combined strength, hardness, and toughness, as shown by being capable of withstanding greater bending without breaking, especially at high temperatures, than has been possible heretofore.

A further object of my invention is to provide hard compositions of matter of this nature which will have great combined strength and hardness, and which will be particularly durable when used as a tool point for cutting hard materials at high speeds. A special object of this invention is to provide a tool material for machining steels of all hardnesses at high speeds.

A further object of my invention is to provide such a hard composition of matter having therein minute particles of hard carbide, in which the grain growth, or agglomeration of particles, during the cementing process, has been minimized, thereby effecting a composition having greater combined strength and hardness, and resistance to wear, than was possible heretofore, together with a desirable thermal conductivity. Yet other objects of the invention are to provide such hard compositions of matter in which the large total surface area of the minute particles of the carbide is such as to effect extremely thin films of the binding material, even when a large percentage by weight of the binding material is used, with consequent increase in the capacity of the tool to be bent without breaking, and to provide that the binding material itself shall be strong at ordinary temperatures and at the high temperatures to which such tools are subjected in use.

A further object of the invention is to provide such hard compositions of matter which are free from embrittling impurities, and which are of uniform composition throughout, particularly as to the binder material content.

Heretofore, hard compositions of matter have been described, which contain a mixture of tungsten carbide, tantalum carbide, titanium carbide and an auxiliary metal such as cobalt, iron or nickel, as proposed for instance, in U. S. Letters Patent No. 1,973,428, Comstock, which patent also refers to the formation of a cemented carbide material containing tungsten carbide and titanium carbide cemented in an auxiliary metallic matrix. Likewise, U. S. Patent No. 1,959,879, Schwarzkopf, proposes the mixing together of carbides of at least two of the elements of the third, fourth, fifth and sixth groups of the periodic table to form "mixed crystals", and to form a hard material by cementing such mixed crystals with an auxiliary metal of the iron group as a binder.

The chemical compound described herein and used to form hard compositions by the method herein described, and which carbide compound is referred to as $WTiC_2$, is distinct from a mixture of tungsten carbide and titanium carbide, as referred to by Comstock, and distinct from mixed crystals, as described by Schwarzkopf, even if the tungsten and titanium are present in the same proportions as in the $WTiC_2$, in that the $WTiC_2$ is harder, has a specific gravity different from the mixture of carbides or a solid solution of one of such carbides in the other, is not attacked by aqua regia, and has numerous other characteristics distinguishing it from a mixture of the carbides or mixed crystals of such carbides. I have made hard cemented carbide materials in accordance with the Comstock patent disclosure, and also in accordance with the Schwarzkopf patent disclosure, using tungsten carbide and titanium carbide in such proportion as to have the same ultimate atomic content as in the new carbide compound $WTiC_2$, and have found such hard cemented materials to have definitely different characteristics, as compared with hard compositions of matter made by using the new carbide compound $WTiC_2$ as the carbide ingredient in accordance with the present process, in that the hard compositions of matter made in accordance with the process herein described, using $WTiC_2$ in lieu of mixed crystals or mixtures of WC and TiC, are greatly superior in combined breaking strength and hardness, and have a desirably lower thermal conductivity, and offer much greater resistance to cavitation and wear when used as a metal-cutting tool point for machining steels or copper-silicon cast iron.

I have likewise made hard cemented carbide materials by following exactly in each case the process herein described, except that mixtures of tungsten carbide and titanium carbide were used in place of $WTiC_2$, in such proportions as to effect the same tungsten and titanium content. Comparative tests with pieces similarly made but containing $WTiC_2$ showed that the hard compositions of matter containing $WTiC_2$ as an ingredient are greatly superior to the material made by the same process but using a mixture of tungsten carbide and titanium carbide in that they had an equal or greater strength on transverse rupture tests, were definitely harder, had a much lower thermal conductivity, and lasted at least twice as long when used as tool points for machining copper-silicon cast iron brake drums, and five times as long when used as tool points for machining steels, under the same conditions of test in each case.

In general, in carrying out the present invention, hard carbide particles are ground in a ball mill having a hardened steel surface, with hard carbide balls, preferably about ⅝" in diameter and formed of a hard composition of matter substantially corresponding to the composition to be formed, the ball mill being filled with a hydrocarbon such as naphtha, which has been previously treated with sodium to remove impurities. After grinding for a long period, which may vary from one to five or more days, the charge is removed, the surplus naphtha is decanted and the residue dried by air blast until it contains only about 1% to 2% of naphtha. Finely divided cobalt, or nickel, or tungsten, or other binder metals such as carburized tungsten which is hereinafter referred to as "W—C", or a mixture of such binder materials, in the form of finely divided particles and mixed if desired under naphtha in a colloidal mill, are added to the ground, hydrocarbon-saturated, carbide material or, preferably, the selected carbide materials and binder materials are initially ground together in a ball mill such as described. In any case, the finely divided particles of carbide material and the finely divided particles of binder material are thoroughly mixed in purified naphtha, or a similar hydrocarbon, which is removed to leave only about 1% to 2% of the hydrocarbon, in which condition the mass is readily moldable and can easily be formed to any shape desired. From such moldable mass, a piece is formed of the desired shape, and of dimensions sufficiently larger than those desired to compensate for shrinkage of from 15% to 25%, and such piece is subjected to compacting pressure, preferably in a hydraulic chamber, of the order of approximately thirty-two thousand pounds to the square inch. The piece, so formed, is placed in an electric induction vacuum furnace, together with metallic magnesium in the proportion of approximately one part of magnesium for each 200 to 300 parts of the piece or pieces, and the furnace is heated slowly to reach in about two hours a temperature above 1315° C., and preferably approximately 1445° C., and maintained at that temperature for a period varying from fifteen to sixty minutes. During the heating, the furnace chamber is evacuated to obtain a pressure of from 40 to 7 microns of mercury, such high vacuum being maintained while the temperature of the pieces is above 1400° C., preferably by means of a mercury diffusion pump connected to the furnace chamber, and a suitable oil pump preferably connected to the outlet of the mercury diffusion pump, as shown and described in my Letters Patent No. 2,093,845, issued to me September 21, 1937. After the furnace and its contents have cooled, the formed piece or pieces may be removed and are ready for use.

One specific example of such a hard composition of matter illustrating the invention was formed from a mixture consisting of 45% $WTiC_2$, 17% macro-crystalline TaC, 15% finely divided Co, and 23% W—C (carburized tungsten obtained by heating tungsten and carbon and containing 6.08% carbon by analysis). These ingredients were placed in a hardened steel ball mill, with a charge of ⅝" diameter hard carbide balls, the mill was filled with naphtha which had been previously treated with sodium, and the ingredients were ground together for about one hundred hours. The charge was removed from the ball mill and the surplus naphtha was removed until a residue of about 1% to 2% was left, in which condition the mass was readily moldable. From such mass, a number of pieces were formed, of such size and shape as to be approximately .200" x .375" x .750", after allowing for approximately 20% shrinkage during the compacting and heat treatments. Several of such pieces were placed, with one gram of magnesium metal, in a 9" electric induction vacuum furnace, having connected thereto a mercury diffusion pump for the removal of vapor and gases, and a mechanical oil vacuum pump for the removal of gases and, with both pumps in operation throughout the heating, the pieces were slowly heated to about 1100° C. over a period of half an hour, and then heated from 1100° C. to about 1450 C. in the succeeding thirty minutes, and maintained at a temperature of 1450° C. for fifteen minutes, after which the furnace and its contents were allowed to cool and the pieces were removed for testing. Tests of such pieces by a standard transverse rupture test, showed that they required a force of 2300 kg. to break them when supported beween $\frac{7}{16}$" centers and pressed in the middle with a Brinell ball, which by calculation indicated a strength on beam formula of 284,280 lbs./sq. in. A test of such pieces by the standard Rockwell "A" hardness test showed that they had a hardness of 91.0 Rockwell "A". Upon test they showed a thermal conductivity of .0685 cal./°C./cm./sec., that is, .0685 calorie per degree centigrade per centimeter per second.

As compared with such pieces, similar pieces made by using separate carbides in the same ultimate atomic proportions of tungsten and titanium, including macrocrystalline TiC of great purity, which pieces were formed in identically the same way, the strength of such carbide pieces formed from the separate carbides was found to be almost as much as that of the pieces containing $WTiC_2$, but the hardness was found to be 89.9 Rockwell "A", and the thermal conductivity was found to be approximately .094 cal./°C./cm./sec. The pieces were tested as cutting tools, by using them in a Bullard machine for machining copper-silicon cast iron brake drums, at 150 to 160 ft./min., and with .020" feed per revolution, and $\frac{1}{16}$" to $\frac{3}{32}$" depth of cut on rough surfaces. Under such conditions, the pieces containing $WTiC_2$ produced 1,273 pieces before the tool had to be reground, while the pieces containing the separate carbides, when used in the same machine, on the same work, and at the same cut and speed, failed by reason of dullness before producing 425 pieces of work. Similar comparative test pieces were formed, one containing 50% $WTiC_2$, 17% TaC, 8% Co, and 25% W—C, and the other containing 50% of a mixture of W—C and TiC in monatomic metallic proportion, 17% TaC, 8% Co, and 25% W—C, so as to have the same ultimate chemical analysis, made by the same method, and with the same amounts of the same binder materials, and on test the pieces containing $WTiC_2$ were found to have a strength of 210,000, with a hardness of 92.3, and a thermal conductivity of .0645, while the pieces containing W—C and TiC had a slightly lower strength, with a hardness of 91.4, and a thermal conductivity of .091. Comparative tests of similarly formed test pieces were made in a large number of instances with varying proportions of carbide content and of binder content, and with the same comparative results, and even greater superiorities of the compositions of matter containing $WTiC_2$ were noted in their resistance to cratering and wear when used in the cutting of steels. Likewise, the thermal conductivity of the pieces containing $WTiC_2$ was characteristically lower, at least when the binding material was less than 60% of the composition.

I have formed many different hard compositions of matter, following the process above described, containing varying proportions of $WTiC_2$, and using various binder materials and varying the percentage thereof, as well as including other carbide materials in addition to the $WTiC_2$, which compositions included those shown in the following "Table A", which indicates the ingredients of some specific examples, together with their characteristics as shown by tests, the first and fifth examples in which tabulation have been referred to hereinbefore:—

In the above table, "Ta(Cb)C" is used to indicate a solid solution of CbC in TaC, and the substance used contained approximately 84% TaC and 16% CbC. "Cb(Ta)C" is similarly used to indicate a solid solution of TaC in CbC, and the substance used contained approximately 83% CbC and 17% TaC. "W (metal)" is used to indicate tungsten metal powder. "W—C" is used to indicate amorphous carburized tungsten formed by heating tungsten particles or tungsten oxide with carbon in an atmosphere of hydrogen, or by any other suitable carburizing method, and the material used contained from 6.08% to 6.1% carbon by test. The Example 14, above, was formed as otherwise described except that the heating was in an atmosphere of hydrogen, without the use of magnesium or the vacuum process, at 1482° C. The thermal conductivity of Examples 7 to 13, inclusive, was below 0.07.

The novel compositions I have formed have had ingredients which may be classified as (1) the new carbide compound $WTiC_2$, with (2) a binder material, which may be, (a) one or more metals of the group consisting of cobalt and nickel, or (b) one or more metals of the group consisting of cobalt and nickel, together with one or more metals of a group consisting of tungsten and molybdenum, or (c) one or more metals of a group consisting of cobalt and nickel, together with one or more metals of a group consisting of tungsten and molybdenum, these last two metals having carbon with them either in the form of a carburized metal, or a mixture of the metal or metals with carbon.

Also I have formed novel hard compositions of matter having ingredients which may be classified as (I) the new chemical compound $WTiC_2$, with (II) tantalum carbide or columbium carbide, or multi-carbide bodies having CbC or TaC as a major constituent, and having as a minor constituent in solid solution in the major constituent one or more compounds selected from the group consisting of TaC, CbC, TiC and ZrC, and (III) a binder material which may be (A) of one or more metals of the group consisting of cobalt and nickel, or (B) one or more metals of the group consisting of cobalt and nickel, together with one or more metals of the group consisting of tungsten and molybdenum, or (C) one or more metals of the group consisting of cobalt and nickel, together with one or more metals of the group consisting of tungsten and molybdenum, these last two metals having carbon with them either in the form of carburized metal or metals, or a mixture of the metal or metals with carbon.

If $WTiC_2$ is used as the hard carbide material without including any auxiliary carbide, the binder material used should preferably be, first, one or more metals of the group consisting of cobalt and nickel, in which case the amount of

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Content in Percent | | | | | | | | | | | | | | |
| *Carbide* | | | | | | | | | | | | | | |
| $WTiC_2$ | 45 | 45 | 50 | 50 | 50 | 50 | 58 | 58 | 58 | 60 | 72 | 75 | 36 | 17 |
| TaC | 17 | | | | 17 | | 17 | 17 | 17 | | | | 17 | |
| TiC | | | | | | 17 | | | | | | | | |
| Ta(Cb)C | | 17 | 17 | 17 | | | | | | | | | | |
| Cb(Ta)C | | | | | | | | | | 11 | | | | |
| *Binder* | | | | | | | | | | | | | | |
| Co | 15 | 15 | 12 | 8 | 8 | | 10 | 5 | 25 | 16 | | 25 | 12 | 4 |
| Ni | | | | | | 8 | | | | | 14 | | | |
| W (metal) | | | | | | | | | | | 14 | | | |
| W—C | 23 | 23 | 21 | 25 | 25 | 25 | 15 | 20 | | 13 | | | 35 | 79 |
| *Properties* | | | | | | | | | | | | | | |
| Strength | 284280 | 269700 | 243000 | 208320 | 210000 | 216000 | 192000 | 160000 | 326000 | 268000 | 242000 | 350000 | 245000 | 226000 |
| Hardness | 91.0 | 91.1 | 90.9 | 92.1 | 92.3 | 91.8 | 91.2 | 94.1 | 89.2 | 90.8 | 91.0 | 88.0 | 91.0 | 91.9 |
| Thermal cond. | .0685 | .0650 | .0645 | .0645 | .0645 | .0640 | | | | | | | | .150 | said binder material may be from 3% to 30% of the composition, or, second, one or more metals of the group consisting of cobalt and nickel together with one or more metals of the group consisting of tungsten and molybdenum, in which case the total amount of said binder material may be from 10% to 50% of the composition, and up to 80% of said binder material may be a metal or metals of the group consisting of tungsten and molybdenum, or, third, one or more metals of the group consisting of cobalt and nickel, together with one or more metals of the group consisting of tungsten and molybdenum, said tungsten and molybdenum having taken up carbon, in which case the amount of said binder material may be from 10% to 55% of the composition, and up to 80% of said binder material may be one or more metals of the group consisting of tungsten and molybdenum, including the carbon which they have taken up.

If $WTiC_2$ is used together with an auxiliary carbide, such as TaC, CbC, Ta(Cb)C, Ta(Ti)C, Ta(Zr)C, Ta(CbTi)C, Ta(CbZr)C, Ta(TiZr)C, Ta(CbTiZr)C, Cb(Ta)C, Cb(Ti)C, Cb(Zr)C, Cb(TaTi)C, Cb(TaZr)C, Cb(TiZr)C or Cb(TaTiZr)C, disclosed in my copending application, Serial No. 31,521, filed July 15, 1935, and formed as described in my copending application, Serial No. 64,602, filed February 18, 1936, as a division of said application and the percentage of the new carbide $WTiC_2$ is decreased by the percentage of the auxiliary carbide added, the specifications for the percentages of binder materials, and the composition of the binder material, remain within the limits stated above.

In forming compositions of the class first indicated above, that is, not including, with the new carbide $WTiC_2$, any auxiliary carbide or carburized metal except as a binder ingredient, I have used from 17% to 95% of $WTiC_2$ with the balance of 83% to 5% of binder material, and for use in making pieces for cutting steels the composition preferably should contain from 45% to 95% $WTiC_2$, it being preferable to use as a binder both cobalt and carburized tungsten or molybdenum, the cobalt dissolving the carburized tungsten or molybdenum and forming a strong binder which effects a hard composition of matter which can be deformed to a greater extent without rupture than can a similar composition using W—C, in place of $WTiC_2$, and with the same amount of cobalt as a binder, and is also much harder. I believe that, up to a given percentage, the W—C is dissolved in the cobalt or nickel, at the cementing temperature used, to form a molten eutectic, which does not attack the $WTiC_2$ particles, despite their small size, thoroughly wetting the surfaces of such exceedingly minute particles of $WTiC_2$ to form a strong bond, without dissolving them, and minimizing the agglomeration or growth of such particles, but leaving them "keyed" together.

I believe that, in the compositions, as made heretofore, by cementing W—C with cobalt as a binder, the metallic cobalt unites with the very finest of the particles of the carburized tungsten in the ground mixture to form a eutectic, as the temperature passes 1350° C., resulting in their elimination as hard carbide material, and leaving only larger particles embedded in such eutectic binder; wheras, by using, as hard carbide material, particles of $WTiC_2$, ground to exceedingly small size, with or without other carbides such as TaC, Ta(Cb)C, Cb(Ta)C or the like similarly ground, which are likewise insoluble in the matrix, compositions of matter are produced which are fine-grained and in which any tendency toward grain growth or agglomeration is minimized. It will be appreciated that, as in any high-speed tool steel or other material used for such cutting purposes, the durability increases with fineness of grain.

The use of magnesium in the cementing process has various valuable effects. It acts as a "getter", combining with gases such as oxygen and nitrogen, to prevent oxidation, and to assist materially in attaining the extremely high vacuum desired. It has also been noted that in some cases traces of magnesium remain in the finished pieces, either as magnesium carbide or alloyed with other substances, and seems to improve the strength of the composition. Comparative tests, with and without the use of magnesium, indicated that in some cases, if magnesium is not used, and particularly if a temperature over 1400° C. is used, there is a tendency for cobalt, when used as a binder, to vaporize to a slight extent from the surface of the piece, so that there is a slight deficiency of cobalt at the surface as compared with the rest of the piece, and a deposit of cobalt has been noted on cooler portions of the furnace. However, it has been noted that when magnesium was used, this deficiency of cobalt in the surface of the piece, as well as the deposit on the furnace wall, did not occur. I believe that the magnesium provides an atmosphere of metallic vapor in the vicinity of the pieces which minimizes, or prevents, the vaporization of the cobalt.

The thermal conducitvity of approximately .0645 found in these hard compositions of matter is particularly desirable in tools for cutting steels. On the other hand, for rapid cutting of cast iron which has a crumbly, or granular, chip, a high thermal conductivity is very desirable and is essential if reasonable tool life is to be had at speeds above 300 ft./min. The reason for this is that, when the chips break short, the generation of heat by friction is localized very close to the cutting edge, usually to the area between the cutting edge and a line several thousandths of an inch therefrom, so that it is desirable that the tool have a high thermal conductivity to facilitate the rapid conduction of such heat to the body of the tool, to minimize the maximum temperature developed at the cutting edge. It will be understood that, in cutting steels at high speed, the problem is quite different, because the chips are being split off and curled, and engage the tool surface in an area spaced a material distance from the edge, that is, at the area where "cratering" would occur. Since the chip is being rapidly deformed and thereby heated to a high temperature, usually to incandescence, it is desirable that the tool conduct away from such area as little heat as possible, primarily because it is advantageous that the chip be not materially cooled by its contact with the tool, because it is less readily curled or deformed, when cooled. The Example 14 of "Table A", above, was intended for use in cutting cast iron, and has been found to be very efficient for that purpose, its high thermal conductivity serving to conduct heat away from the cutting edge.

What I claim is:

1. A hard composition of matter, comprising particles of the compound $WTiC_2$ cemented in a matrix.

2. A hard composition of matter, comprising particles of the compound $WTiC_2$ cemented in a matrix comprising metallic material selected from the group consisting of cobalt and nickel and constituting from 3% to 30% of the composition.

3. A hard composition of matter, comprising particles of the compound $WTiC_2$ cemented in a matrix containing cobalt in an amount constituting from 3% to 30% of the composition.

4. A hard composition of matter, of which from 45% to 90% is hard carbide material predominantly the compound $WTiC_2$, cemented in a matrix containing a metallic material selected from the group consisting of cobalt and nickel and containing a metallic material selected from the group consisting of tungsten and molybdenum.

5. A hard composition of matter, of which from 45% to 90% is hard carbide material predominantly the compound $WTiC_2$, cemented in a matrix containing a metallic material selected from the group consisting of cobalt and nickel with a material selected from the group consisting of carburized tungsten and carburized molybdenum, said latter material constituting up to 80% of said matrix.

6. A hard composition of matter, comprising carbide material in an amount of from 70% to 97% of the composition made up of particles of the compound $WTiC_2$ and particles of material comprising a carbide selected from the group consisting of TaC, CbC, TiC and ZrC, all of said particles being cemented in a matrix.

7. A hard composition of matter, comprising particles of the compound $WTiC_2$ cemented in a matrix containing cobalt and a material having carbon associated therewith and selected from the group consisting of tungsten and molybdenum.

8. A hard composition of matter, comprising particles of the compound $WTiC_2$ in an amount of from 45% to 58% of the composition, together with particles of material containing a carbide selected from the group consisting of TaC, CbC, TiC and ZrC, said particles being cemented in a matrix constituting from 25% to 50% of the composition and containing cobalt and containing tungsten having carbon associated therewith.

PHILIP M. McKENNA.